(12) United States Patent
Rubin et al.

(10) Patent No.: US 7,539,682 B2
(45) Date of Patent: May 26, 2009

(54) MULTILEVEL SECURE DATABASE

(75) Inventors: Donald B. Rubin, Derwood, MD (US); Arthur T. Rask, Fairfax, VA (US); William C. Neumann, Columbia, MD (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 11/079,055

(22) Filed: Mar. 14, 2005

(65) Prior Publication Data

US 2006/0206485 A1  Sep. 14, 2006

(51) Int. Cl.
*G06F 7/00* (2006.01)
(52) U.S. Cl. ........................................................ 707/9
(58) Field of Classification Search ...................... 707/9
See application file for complete search history.

(56) References Cited

U.S. PATENT DOCUMENTS

| | | | |
|---|---|---|---|
| 2002/0010679 A1* | 1/2002 | Felsher | 705/51 |
| 2004/0015701 A1* | 1/2004 | Flyntz | 713/182 |
| 2006/0059567 A1* | 3/2006 | Bird et al. | 726/27 |

* cited by examiner

*Primary Examiner*—Charles Rones
*Assistant Examiner*—Fazlul Quader
(74) *Attorney, Agent, or Firm*—Vierra Magen Marcus & DeNiro LLP

(57) ABSTRACT

Row level security (RLS) and cell level security (CLS) are implemented in a database to provide secure dynamic access to database data. Encryption keys are created based on either security classification meta-data tags associated with the individual fields of an incoming data stream or on the security classification of the source network. Without prior knowledge of the incoming data security classification, the present system may generate encryption keys and, if necessary, security classification meta-data on the fly.

20 Claims, 14 Drawing Sheets

440

| CatID | MarkRoleName | UniqLabelID |
|---|---|---|
| 1 | T | 100 |
| 2 | Q | 100 |
| 3 | US | 100 |
| 4 | A | 100 |
| 1 | S | 200 |
| 2 | M | 200 |
| 3 | GB | 200 |
| 4 | A | 200 |
| 4 | B | 200 |
| 1 | C | 300 |
| 2 | M | 300 |
| 3 | US | 300 |

|   | C1 | C2 | C3 | C4 | C5 | C6 | C7 |
|---|----|----|----|----|----|----|----|
| R1 |  |  |  |  |  |  |  |
| R2 |  |  |  |  |  |  |  |
| R3 |  |  |  |  |  |  |  |
| R4 |  |  |  |  |  |  |  |
| R5 |  |  |  |  |  |  |  |
| R6 |  |  |  |  |  |  |  |

|   | C1 | C2 | C3 | C4 | C5 | C6 | C7 | Row Label | RLS ID |
|---|----|----|----|----|----|----|----|-----------|--------|
| R1 |  |  |  |  |  |  |  |  |  |
| R2 |  |  |  |  |  |  |  |  |  |
| R3 |  |  |  |  |  |  |  |  |  |
| R4 |  |  |  |  |  |  |  |  |  |
| R5 |  |  |  |  |  |  |  |  |  |
| R6 |  |  |  |  |  |  |  |  |  |

| Category Attribute | | Design Implication |
|---|---|---|
| Domain | | Define all labels in the tblCategory and tblMarking tables<br><br>Create a database role to represent each marking, using role nesting for hierarchical categories. Membership in the role means the user has that access. |
| Hierarchical | Yes | Nest roles to model hierarchy |
| | No | No action |
| Cardinality | 1 | Constrain number of markings on one label using triggers OR de-normalize the category into a field in tblUniqueLabel<br><br>Treat the Compare Rule as ANY |
| | 1..* | No action |
| | 0..1 or 0..* | As above, but for each tblUniqueLabel that has zero markings in that category, create a row in tblUniqueLabelMarking assigning the DefaultRole (e.g., public). This will make the category non-restrictive for that label. |
| Compare Rule | ANY | Use this where-clause predicate in the vwVisibleLabels view:<br><br>`ID IN (SELECT ID FROM tblUniqueLabelMarking WITH (NOLOCK) WHERE CategoryID = n AND IS_MEMBER(MarkingRoleName) = 1)` |
| | ALL | Use this where-clause predicate in the vwVisibleLabels view:<br><br>`1 = ALL(SELECT IS_MEMBER(MarkingRoleName) FROM tblUniqueLabelMarking (NOLOCK) WHERE CategoryID = n AND UniqueLabelID = tblUniqueKeyToLabelMapping.ID)` |

Figure 8B

MULTILEVEL SECURE DATABASE

BACKGROUND OF THE INVENTION

1. Field of the Invention

The present invention is directed to secure database systems.

2. Description of the Related Art

Databases often contain data having different permission levels required for access. In most instances, databases store data in vertical columns and horizontal rows. Thus, a database may have one row or cell for which a first level of permission is required and a second row or cell for which a second level of permission is required. This is typical in databases used by the Intelligence Community (IC). In these situations, some users are to have access to data that other users are not permitted to access. Access of data within a database may also be limited in other fields, such as healthcare, finance, and other areas.

Currently, some databases provide row level security by generating an access table for combinations of every possible user access level and rows of data to be accessed. For each combination of user access level and row of data, the table indicates whether or not the user has permission to access the row. This method for providing row level access requires a large amount of memory space as well as processing power each time a user requests access to the data.

Other database solutions place artificial limits on the set of permissions or number of possible labels. They do this because the database software does not provide the flexibility to handle many combinations of user permissions. For example, from a security lattice of 1024 possible permissions combinations, only 21 may be supported (Smith's Lattice). This is in spite of the fact that there are essentially only 9 permissions options to choose from.

Some databases provide data in a single row with different permission levels. Typically, databases assign a permission level to the row that matches the highest cell permission requirement in the row. This prevents access to users who should have access to a particular cell but don't have the permission level of the highest cell in the row.

Other database systems generate a pre-determined number of secure data sets associated with different security levels. Requests for data are then compared to each data set. If a predetermined secure data set matches the data request, the matching secure data set is provided. If no existing data set matches the request, a predetermined secure data set associated with a security level less than that associated with the request is provided in response to the request.

Still other database systems utilize a set of distributed databases and broker access to them. This allows a user to access data from the database(s) having information that the user is cleared to access. Other secure database systems utilize a codebook and schema information to decrypt data received by a user station from a remote database. Accessing different databases in a distributed database system requires more processing time and doesn't provide for a central storage means for data. Additionally, most of the distributed database schemes provide row level security only.

Secure database systems may receive data from different sources. The received data is inserted into a database and made available to the appropriate users. The data sources often present the data permissions associated with the sent data in different formats. This makes it difficult to collaborate secure data between data sources and is cause in part for the generation and use of access tables to describe permission levels for individual rows of data for users.

SUMMARY OF THE INVENTION

The technology herein, roughly described, pertains to providing security at the row level and cell level of a database. One embodiment includes a method for generating an encryption key for a database field. First, data is accessed. Next, security information associated with the accessed data is derived. Then, one or more encryption keys are generated for the accessed data. The encryption keys are associated with the security information and with a database cell associated with the accessed data.

In another embodiment, a method is disclosed for providing access to a database. The method begins with receiving a set of user access tokens. Clearance information associated with each user access token is then retrieved. Next, a selected portion of the clearance information is associated with selected data within a database. Data access is then provided to the data associated with the selected portion of the clearance information.

In yet another embodiment, a method for managing metadata begins with receiving one or more sets of data tokens. A category is then determined for each token. Next, a data label is generated for each set of data tokens. Finally, each token in the set of data tokens is associated with the determined category and generated data label.

BRIEF DESCRIPTION OF THE DRAWINGS

FIG. 5B illustrates an example of a unique label marking table.

FIG. 6A illustrates an example of a database.

FIG. 6B illustrates an example of a database providing row level security.

FIG. 8B illustrates a table having example labeling scheme design rules.

DETAILED DESCRIPTION

Figure 1:
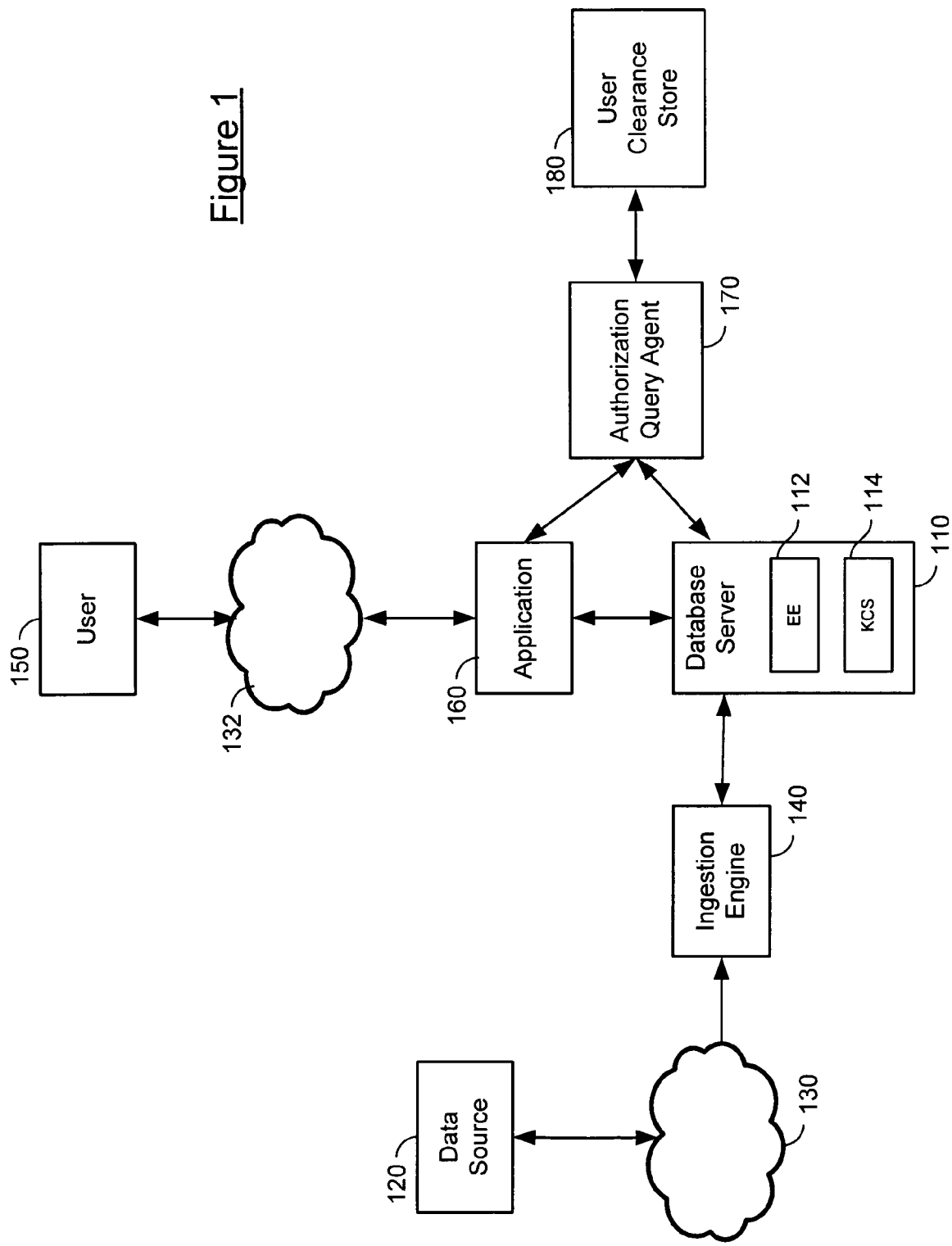
FIG. 1 illustrates an embodiment of a system for implementing row level and cell level security in a database.

Row level security (RLS) and cell level security (CLS) are implemented in a database. RLS and CLS can be used to provide secure dynamic access to data within a database for use by the Intelligence Community (IC) or other entities. In one embodiment, encryption keys are created based on either security classification meta-data tags associated with the individual fields of an incoming data stream or on the security classification of the source network. Thus, without prior knowledge of the incoming data security classification, the present system may generate encryption keys and, if necessary, security classification meta-data on the fly as it is received. The security classification meta-data can be used to encrypt record data down to the field (cell) level.

In one embodiment, user combinations of security clearance access tokens are mapped to sets of corresponding security classification tokens which represent data fields that the user is allowed to retrieve. Security clearance access tokens are dynamically constructed based on the security classification of data currently in the database.

Unlike the present invention, prior systems may use a traditional approach of creating tables having rows containing all possible security classifications and columns with all security clearances. Prior Database Management Systems (DBMS) provide tables with cells which indicate whether a particular user security classification is permitted to access data having a specific security classification. Other prior systems place artificial limits on the number of possible labels. In some cases, a limited number of categories are allowed (for example, three) and the attributes of the categories are fixed.

In utilizing the dynamically constructed security clearance access tokens, the present invention does not require prior knowledge of the data security classification labels or use of a prohibitively large master table containing all possible security classification labels and corresponding security clearance tokens. Additionally, the data and data processing engines of a DBMS for use with the present invention are contained in a single location. These and other features of the present invention are discussed in more detail below.

A user-accessible view is generated from a base table of data. A user may query the user-accessible view for data. A result set of data may be provided to a user in response to the user request. A view is a construct, or object, in a database that is declared statically. The view is defined with query definitions against another data source, such as a base table. Thus, a view is an object that provides information contained in a parent view or table without necessarily providing access to the underlying parent view or table.

In one embodiment, the process of providing data to a user begins with modifying a base table containing data to include classification information with the base table rows and/or cells. A user accessible view is then created that contains all the data and classifications of the underlying base table. A result set is then generated in response to a query made against the user-accessible view that contains only the data of the user-accessible view that the requesting user has permission to see. No additional information or data is provided to the user upon a request for data. This data model involving a base table, user-accesible view and result set is discussed in more detail below.

In one embodiment, RLS and CLS are implemented using security labels. A security label is a piece of information that describes the sensitivity of data or an object. In one embodiment, a security label can be implemented as a string containing markings from one or more categories. Users or subjects have permissions described with labels from the same domain of markings. In the case of a user label, the markings of the label comprise the tokens associated with the user. Given two labels A and B, label A is considered to dominate label B if every category present in label B is satisfied by markings on level A. As used herein, a security label for a user may be called a "subject label" while a security label for data may be called a "object label". A subject label may be expressed as membership in security groups from the underlying database management system or operating system.

Several variations of labels may be used to manage access to databases. For example, different labels may be used by IC, healthcare, finance, and other entities. For IC applications, accessibility of an object utilizes labels having categories of "classification", "compartment", "releasability by nationality" and "need to know". The classification category includes markings of "top secret", "secret", "confidential", and "unclassified". In one embodiment, classification is hierarchical. Thus, a user with a classification marking of "secret" is said to dominate labels having a classification of "secret", "confidential", and "unclassified". A compartment category describes a group of people within a department or within a boundary of access that have been determined to have access to designated data. Examples of compartment markings include "BN", "W", and "Q". The category of "releasability by nationality", or "nationality", indicates countries or groups of countries of which a user is associated with. Examples of nationality markings include "US" and "GB" (Great Britain). A need to know category includes markings indicating additional access clearances. The typical markings within the need to know category are usually "A", "B", "C", etc. In one embodiment, a label may be implemented by a marking from each category separated by a double slash. For example, a user label may be implemented as TS//Q,Z//US//A, corresponding to markings of "top secret", compartments "Q" and "Z", nationality of "US", and need to know group of "A". The external format of the security label is immaterial to the invention, however. Any format could be used; and in one embodiment the label is canonicalized into an unambiguous internal format. This is discussed in more detail below.

In one embodiment, categories can be characterized by attributes such as domain, hierarchy, cardinality, and comparison rules. The domain of a category indicates the range of possible markings within the category. Hierarchical categories have an ordering among values which determine access. A marking can satisfy any marking at or below its level in the hierarchy. Non-hierarchical categories have no ordering among values. Cardinality describes the number of values from the domain that can be applied to an object. A comparison rule describes whether the subject must have any or all of the markings applied to the object from this category.

FIG. 1 illustrates an embodiment of a system 100 for implementing RLS and CLS in a database. System 100 includes database server 110, data source 120, network 130, ingestion engine 140, user 150, application 160, authorization query agent 170, and user clearance store 180.

RLS and CLS are implemented primarily by server 110. In one embodiment, database server 110 may be implemented as an SQL server provided by Microsoft Corporation of Redmond, Wash. Database server 110 is configured to receive data from data source 120 through network 130. Database server 110 includes encryption engine (EE) 112 and key and certificate store (KCS) 114. EE 112 can be used to encrypt and decrypt data at the row level or cell level within a database, and is discussed in more detail below. KCS 114 is used to store and maintain keys for encrypting and decrypting data as well as certificates used to encrypt and decrypt the keys themselves. This is discussed in more detail below. Each of networks 130, 132 and 134 may be implemented as a private network, a secure network, or a public network such as the Internet.

Data is received by ingestion engine 140 over network 130. In one embodiment, ingestion engine 140 can be implemented separate from or within database server 110. Ingestion engine 140 receives data, processes the received data and loads the data into one or more databases maintained by database server 110. In one embodiment, ingestion engine 140 may receive data from an external database or a direct acquisition source. The received data may or may not be associated with security labels and/or additional signatures. In some cases, ingestion engine 140 will append data with digital signatures and then provide the data and signatures to database server 110. Processing of received data is discussed below with respect to method 300 of FIG. 3.

Data maintained by database server 110 can be accessed by user 150 through application 160. In one embodiment, a user 150 may be a person or entity that requests to view data within database server 110. As illustrated, user 150 may access an application over network 132. When user 150 requests a connection with database server 110, database server 110 initiates a connection with authorization query agent 170. In response, authorization query agent 170 forms a connection with user clearance store 180. User clearance store 180 is queried in order to authenticate requesting user 150.

In some embodiments, user clearance store 180 may be implemented locally on database server 110 (not illustrated in FIG. 1). In some embodiments, user clearance store 180 may be implemented by one or more databases or directories. For example, in a database used for IC applications, user clearance store 180 may be implemented by an intelligence community-wide clearance database and a full service directory. The intelligence community-wide database may maintain clearance, compartment, and nationality information for different users. The full service directory may maintain need to know information. In some cases, unique authorization query agents are used to access each database and directory.

Figure 2:
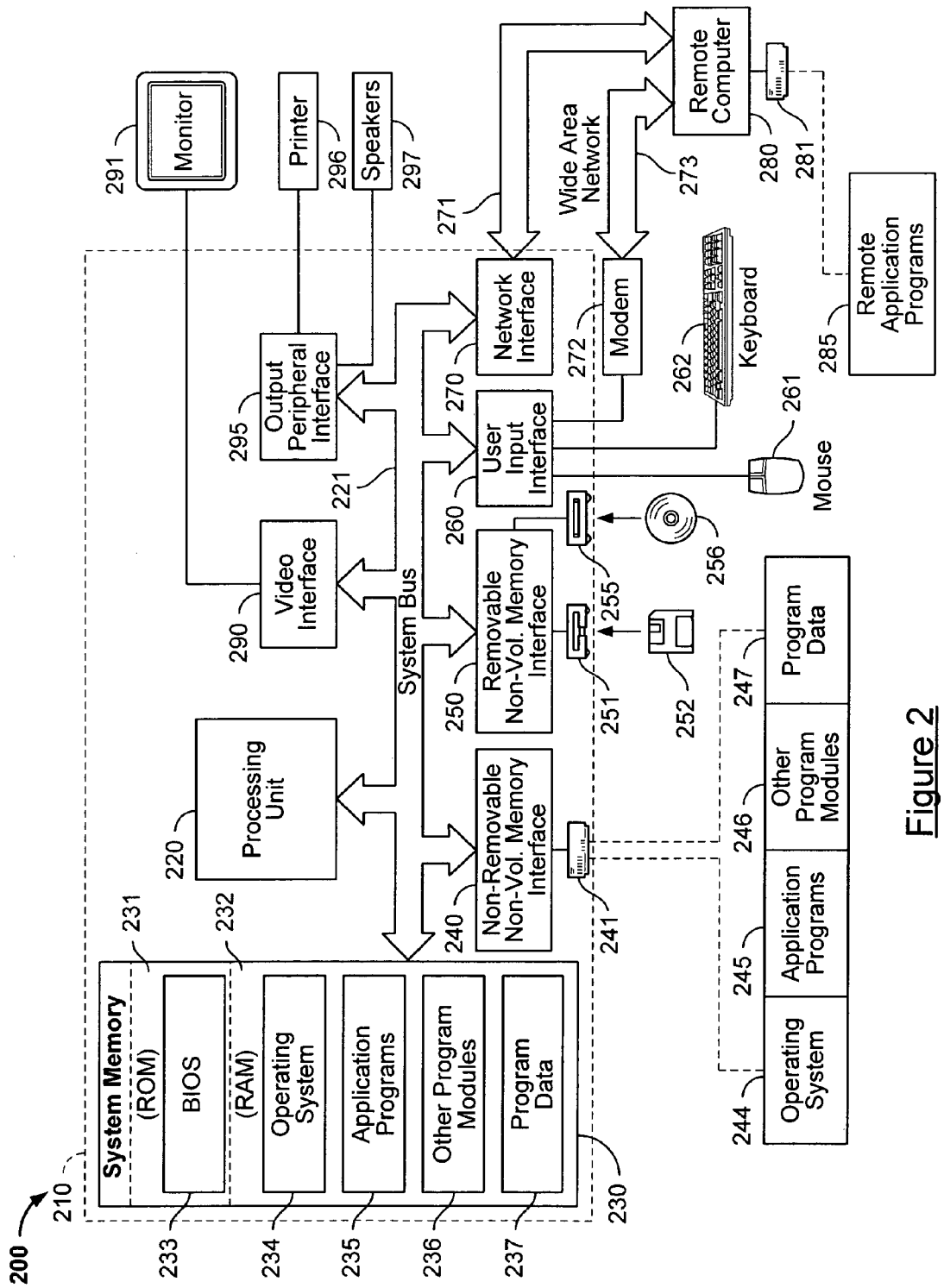
FIG. 2 illustrates an embodiment of a computing environment.

FIG. 2 illustrates an embodiment of a computing environment 200. In one embodiment, database server 110 of FIG. 1 can be implemented by the computing environment of FIG. 2. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
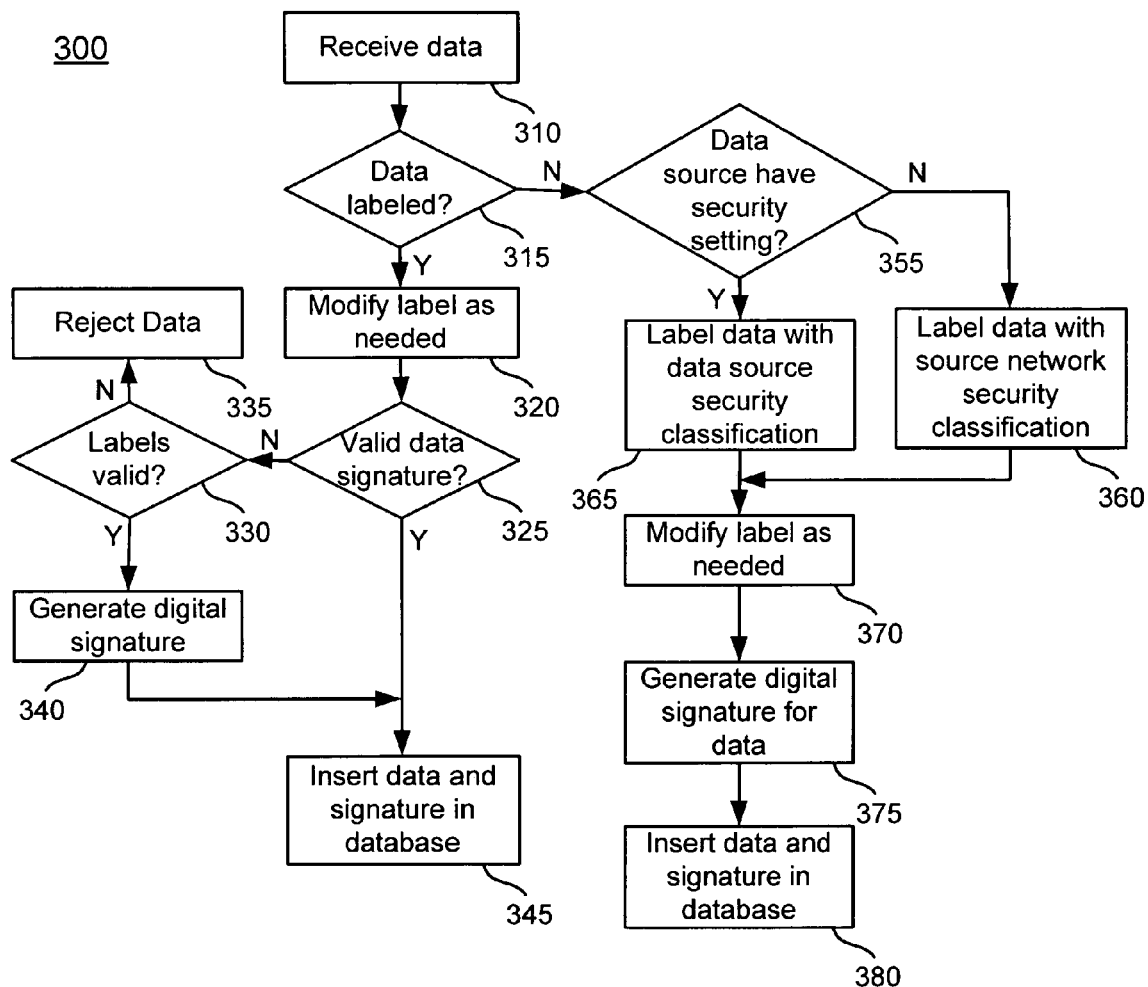
FIG. 3 illustrates an embodiment of a method for providing data to a database.

FIG. 3 illustrates an embodiment of a method 300 for ingesting data into a database that provides RLS and CLS. In one embodiment, method 300 can be implemented by ingestion engine 140 of FIG. 1. Method 300 begins with receiving data at step 310. In one embodiment, data is received from data source 120. Next, a determination is made as to whether the received data is labeled at step 315. In one embodiment, ingestion engine 140 determines if the data stream in which the data is embedded includes additional information containing a data label. If the received data is labeled at step 315, operation continues to step 355. If the received data is not labeled, then operation continues to step 320.

The data label is modified as needed at step 320. For example, data may be received from a network in which only US nationals are allowed access. Data retrieved from this network may not necessarily indicate that the data should only be provided to individuals of US nationality. In this case, ingestion engine 140 may detect that US nationality is required to access the data and will modify markings in the label to reflect this fact.

In one embodiment, canonicalization of labels is performed on data labels received at step 320. This ensures the markings are unambiguous in format and order and aids for accurate comparison. For example, data markings of US, "US only", and "domestic only" may indicate that only US nationals are intended to have access to view a particular piece of data. As a result of the canonicalization, raw labels of "US", "US only", and "domestic only" markings are represented by a uniform marking of "US". In one embodiment, the raw labels attached to the received data may be retained as well.

After labels are formatted as needed, a determination is made as to whether the data has a valid signature at step 325. If the data does not contain a valid signature, then operation continues to step 330. If the data does contain a data signature, then operations continue to step 345. In one embodiment, a data signature is determined to be valid by comparing a generated cryptographic hash mark derived from the received data to the received data signature.

At step 330, a determination is made as to whether the label associated with the data is valid. In one embodiment, the label is valid if the markings of the label categories comply with a standard label format of the present system. In one embodiment, this determination may be performed above with respect to step 320. If the label is determined not to be valid, data is rejected at step 335. If the label is determined to be valid, then a digital signature is generated at step 340. Operation then continues to step 345.

The data and signature are inserted into a database at step 345. The data and signature are provided to database server 110 by ingestion engine 140. Once inserted, the security label associated with the received data at step 345 can be applied at a database row or cell.

If a determination is made that data is not labeled at step 315, a determination is made whether the data source of the received data has a security setting at step 355. Since the received data is not labeled, the security setting for the data is determined from sources besides a label. If the security setting of the data source from which the data was received cannot be determined, operation continues to step 360. If the data source from which the data is received does have a determinable security setting, operation continues to step 365. At step 360, data is labeled with the source network security classification. For example, if the source network requires a security classification of "secret" to access the network, the security classification of the received data will be set to "secret". Operation then continues to step 370.

At step 365, the received data is labeled with the data source security classification. This is performed similarly as in step 360 regarding network security classification. Next, a label associated with the data is modified as needed at step 370. In one embodiment, label modification performed at step 370 is similar to label modification performed at step 320. Next, a digital signature is generated for the received data at step 375. Digital signature generation at step 375 is similar to digital signature generation at step 340. The data and generated signature are then provided to a database as step 380. In one embodiment, a security label associated with data received without a label can be used for RLS within a database.

Figure 4A:
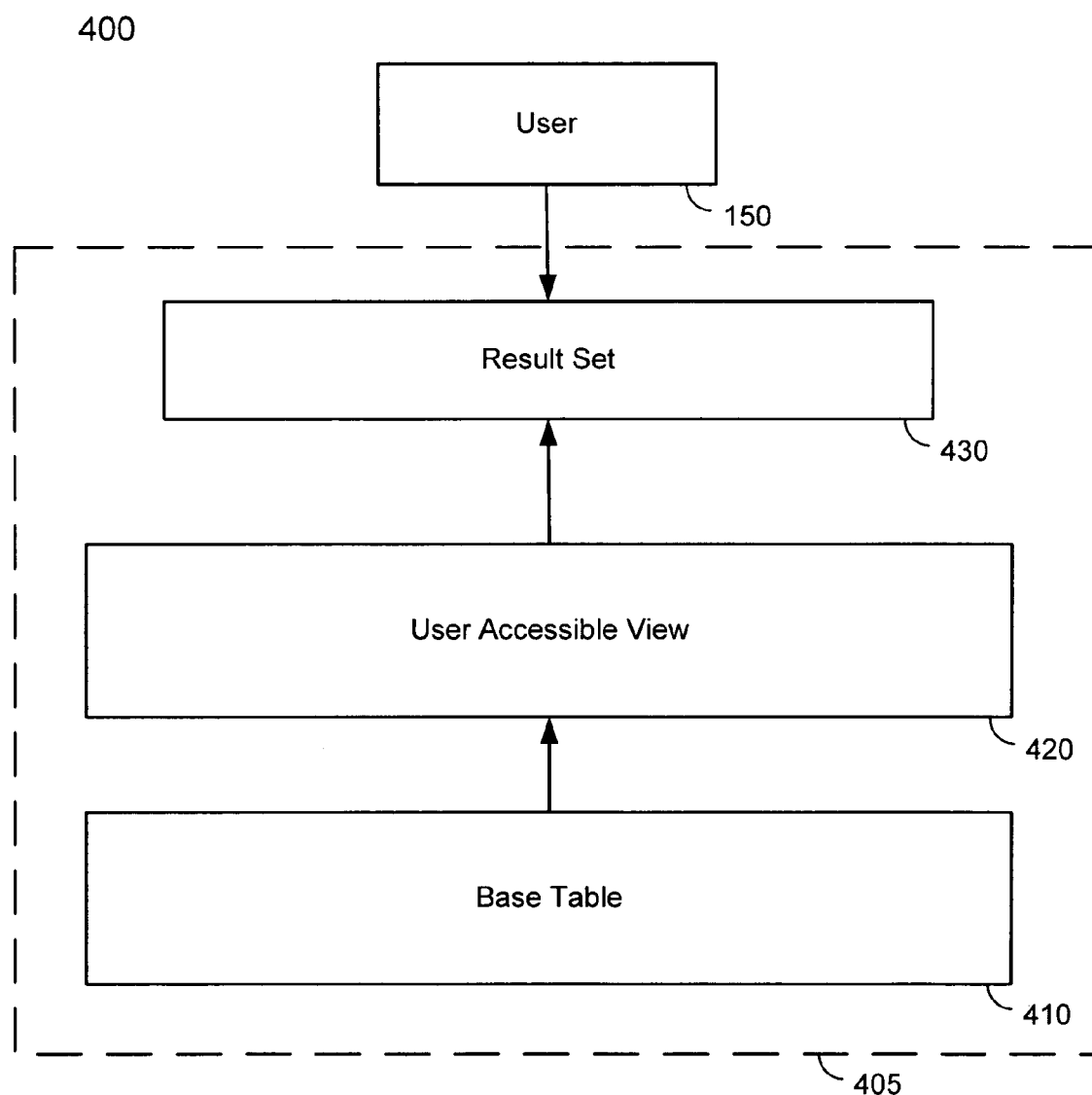
FIG. 4A illustrates an embodiment of a data model for implementing row level security and cell level security in a database.

FIG. 4A illustrates an embodiment of a data model 405 for providing a database incorporating RLS and CLS. Database model 405 includes base table 410, user-accessible view 420, and data set 430. A user 150 may query user-accessible view 420 for data. The user is provided with a data set 430 ultimately derived from base table 410. In FIG. 4, base table 410 is an original table of data. User-accessible 420 is a view wrapped around base table 410. In general, one user-accessible is generated for every base table for which RLS and/or CLS is implemented. Base table 410 is maintained as the source of data for a database. User-accessible 420 is maintained as an object that can be queried with similar content as base table 410. Data set 430 is derived from user-accessible 420 and presented to a requesting user. Data set 430 generally includes a subset of data mapped to the user label. Base table 410 is maintained by database server 110, and loaded with data by ingestion engine 140. Generation of user-accessible 420 and data set 430 is discussed in more detail below.

Figure 4B:
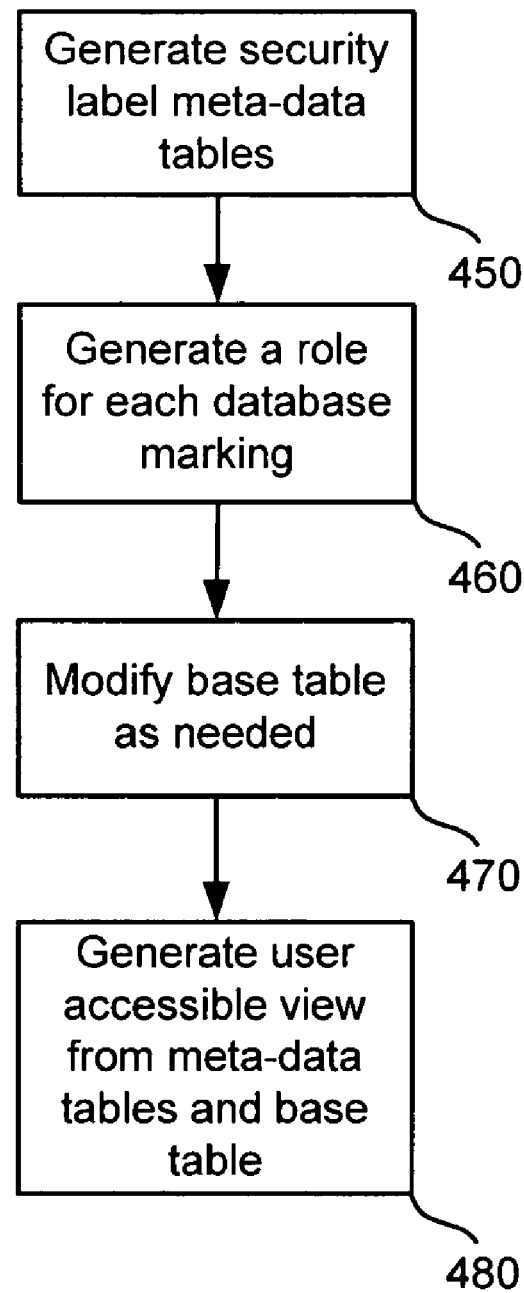
FIG. 4B illustrates an embodiment of a method for generating a base view of a database.

FIG. 4B illustrates an embodiment of a method 440 for generating a user-accessible of a database. Method 440 begins with generation of security label meta-data tables at step 450. The meta-data tables may include label scheme tables, mapping tables and other tables. In one embodiment, one set of tables is generated for each database maintained by a database server of the present invention. The meta-data tables can be used for implementing both RLS and CLS. Generation of meta-data tables and the tables themselves are discussed below with reference to FIG. 5. Next, a role is generated for each database marking at step 460. A role is used to express a portion of a label and used to group permissions of users. In one embodiment, a role is a group of users having the access level of the particular marking. Typically, one role is generated per marking. In one embodiment, a role is a security grouping supported by the underlying COTS DBMS or operating system.

The base table is modified as needed at step 470. In an embodiment wherein RLS is implemented in the database, RLS information is added to a base table. This is discussed in more detail with reference to FIG. 6A-6B below. A user-accessible is then generated from meta-data tables and the updated base table at step 480. The user-accessible is used to generate user views which are provided upon approved user requests.

Figure 5A:
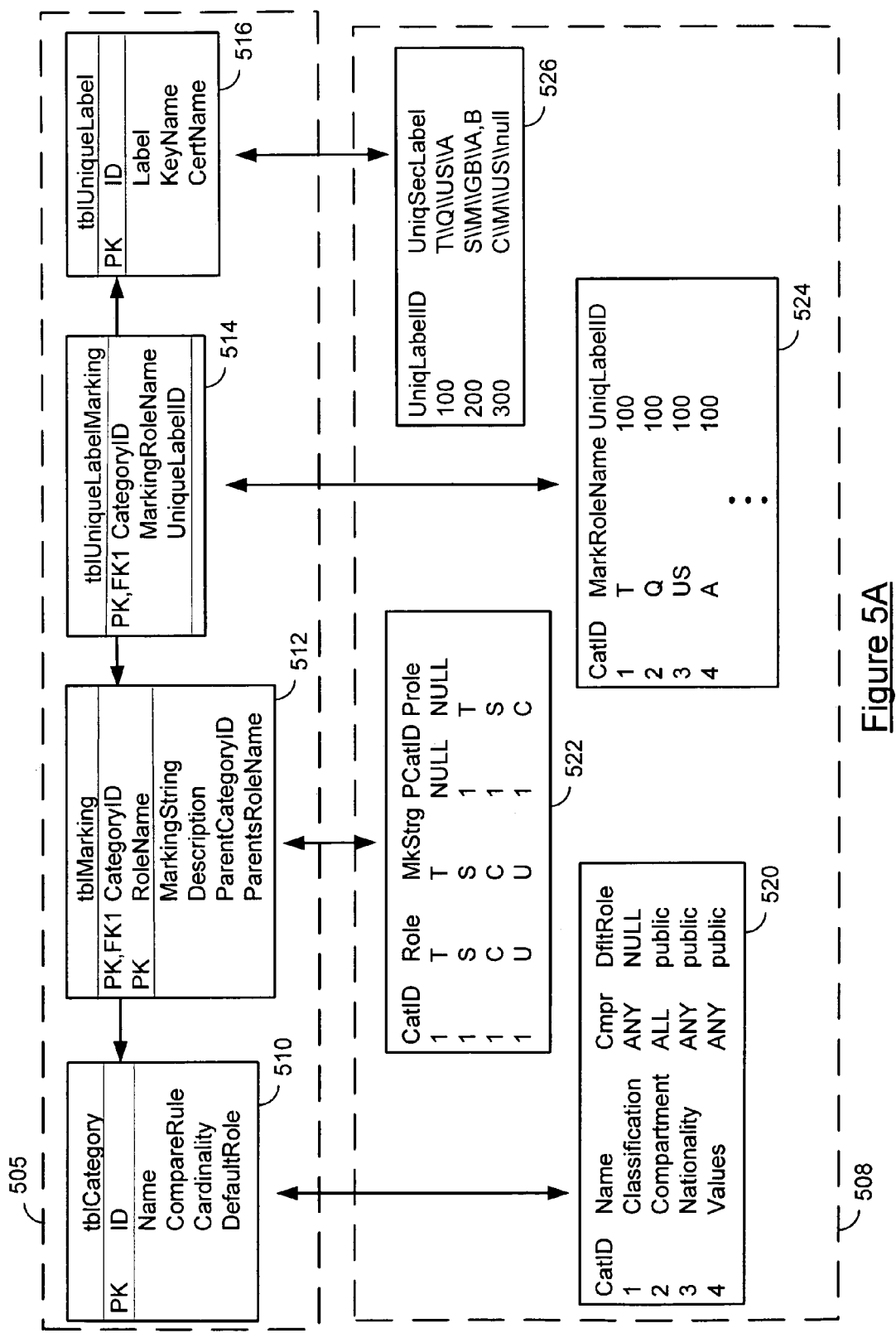
FIG. 5A illustrates an example of security label meta-data table models and tables.

FIG. 5A illustrates an embodiment of security label meta-data table model 505 and corresponding tables 508. Table models 505 include a category table model 510, marking table model 512, unique label marking table model 514, and unique label table model 516. Meta-data tables 508 include category table 520, marking table 522, unique label marking table 524, and unique label table 526. As illustrated in FIG. 5A, table models 510-516 correspond to tables 520-526.

The category and marking table models and tables are used to generate a labeling scheme. Category table model 510 defines label categories to be used for a particular database. Category table model 510 indicates that a corresponding table may include categories of identification, name, compare rule, cardinality, and default role. In one embodiment, all of the categories or a subset of the categories can be used in a corresponding table. As illustrated, table 520 includes categories of name, compare, and default role. The category types can be named classification, compartment, nationality, and need to know. The corresponding compare roles for the named categories are any, all, any, and any. The default roles are all public except for classification, which has a default role of null. Marking table models 512 define a domain for each category of category table model 510. Marking table 522 illustrates an example of a domain for the classification category. The category ID of marking table 522 is one, corresponding to the classification category. The roles of T, S, C, and U are listed, corresponding to top secret, secret, confidential, and unclassified. Additional attributes of the marking table model 512 include role name, marking string, description, parent category ID, and parent role name. Parent category ID and parent role name are used when the markings within a category are hierarchical. As illustrated in table 522, parent category ID for the particular markings are listed as null, one, one, and one. The parent roles for T, S, C, and U are null, T, S, and C, respectively.

Table models 514 and 516 and corresponding tables 524 and 526 are used for access mapping purposes. Access mapping is discussed in more detail with respect to FIGS. 7-8A below. Unique label table 526 lists unique security labels and unique label IDs associated with those unique security labels. In one embodiment, as data is received and assigned a unique security label, a unique label ID is generated. The unique security label and corresponding unique label ID are stored in unique label table 526. Table model 516 illustrates that a unique label may have attributes of identification, a unique label, a key name, and a certificate name. In one embodiment, key name and certificate name are used for CLS purposes and discussed in more detail below. Unique label marking table 524 lists each marking within a unique security label and its associated unique label ID. For example, for unique label ID 100 consisting of T\\Q\\US\\A, the listed marking role names are T, Q, US, and A. For each listed marking role name, the unique label ID is listed in addition to the particular category ID.

In one embodiment, when an SQL server is used, code statements can be used to set up the meta-data tables. A portion of the code statements for generating tables of FIG. 5A is shown below.

—Categories

INSERT tblcategory (ID, Name, CompareRule, DefaultRole)

VALUES (1, 'Classification', 'ANY', NULL)

INSERT tblCategory (ID, Name, CompareRule, DefaultRole)

VALUES (2, 'Compartment', 'ALL', 'public')

INSERT tblCategory (ID, Name, CompareRule, DefaultRole)

VALUES (3, 'Nationality', 'ANY', 'public')

INSERT tblCategory (ID, Name, CompareRule, DefaultRole)

VALUES (4, 'Need-to-Know', 'ANY', 'public')

GO

—Classification markings

INSERT tblMarking (CategoryID, RoleName, MarkingString, ParentCategoryID, ParentRoleName) VALUES (1, 'T', 'T', NULL, NULL)

INSERT tblMarking (CategoryID, RoleName, MarkingString, ParentCategoryID, ParentRoleName) VALUES (1, 'S', 'S', 1, 'T')

INSERT tblMarking (CategoryID, RoleName, MarkingString, ParentCategoryID, ParentRoleName) VALUES (1, 'C', 'C', 1, 'S')

INSERT tblMarking (CategoryID, RoleName, MarkingString, ParentCategoryID, ParentRoleName) VALUES (1, 'U', 'U', 1, 'C')

—Compartment Markings

INSERT tblMarking (CategoryID, RoleName, MarkingString)

VALUES (2, 'Q', 'Q')

INSERT tblMarking (CategoryID, RoleName, MarkingString)

VALUES (2, 'Z', 'Z')

INSERT tblMarking (CategoryID, RoleName, MarkingString)

SELECT 2, DefaultRole, 'none' FROM tblCategory WHERE ID=2

Though only statements that configure markings for classification and compartment are shown, additional code can be used to implement the remainder of the marking as well as additional tables.

FIG. 5B illustrates an example of a unique label marking table 524. As illustrated, each unique security label listed in unique label table 526 is listed along with the corresponding marking role names in table 524 of FIG. 5B. In particular, a row is generated for each marking of the security labels having a unique label ID of 100, 200 and 300. Use of unique label marking table 524 and security label mapping is discussed in more detail below.

As discussed above in method 440, a base table may be modified as needed at step 470. FIG. 6A illustrates an example of a database (or table) 600. As illustrated, a database, or a base table, may contain a number of columns and rows. Database 600 includes seven columns and six rows. Each row of database 600 may be associated with a different security clearance.

FIG. 6B illustrates a database 650 that provides RLS. As shown, the original seven columns and six rows of database 600 are in database 650. Additionally, two columns have been added to database 650 for row label information and RLS identification information. The row label is the actual security label associated with that row. The RLS ID is the unique ID of the security label as indicated in table 524. The row label and RLS ID correspond to the unique security label and unique label ID information, respectfully, of table 524 of FIG. 5A. Use of these two additional rows in security label mapping is discussed in more detail below.

Figure 7:
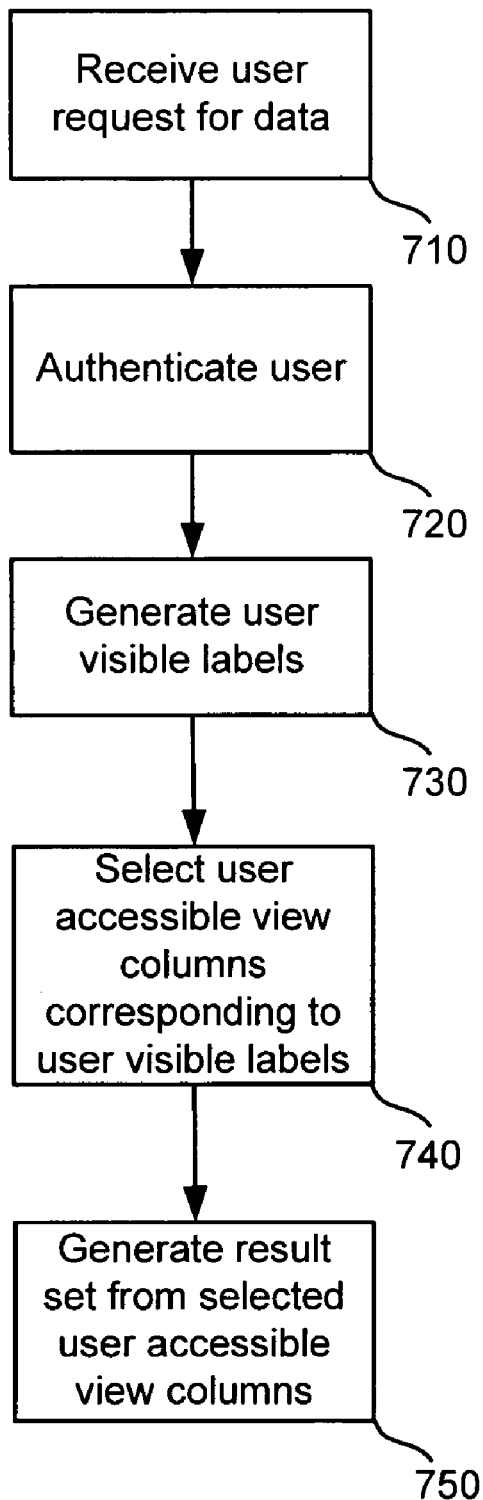
FIG. 7 illustrates an embodiment of a method for generating a user view incorporating row level security.

FIG. 7 illustrates an embodiment of a method 700 for generating a data set incorporating RLS. A user request for data is received at step 710. In one embodiment, the request is received from user 150 by database server 110 of FIG. 1. In particular, the request is received by a user-accessible view associated with a database or base table. Next, the requesting user is authenticated at step 720. In one embodiment, a database server may initiate authentication through authorization query agent 170 of FIG. 1. Authentication of a user may confirm the user identity and determine a user label from the user clearance store. As discussed above, the user label may be generated based on the results of queries made to several different directories. User visible labels are then generated at step 730. User visible labels are a list of labels associated with database rows that a user label dominates. Generation of user visible labels is discussed in more detail below with respect to method 800 of FIG. 8A. After user visible labels are generated, user-accessible columns are selected that correspond to the user visible labels at step 740. In one embodiment, the row labels of user-accessible columns are matched to the visible labels of the user. The columns of the data matching the user visible labels are then selected. The data set is then generated from the selected user-accessible columns at step 750. The resulting data set provides data associated with the matched labels.

Figure 8A:
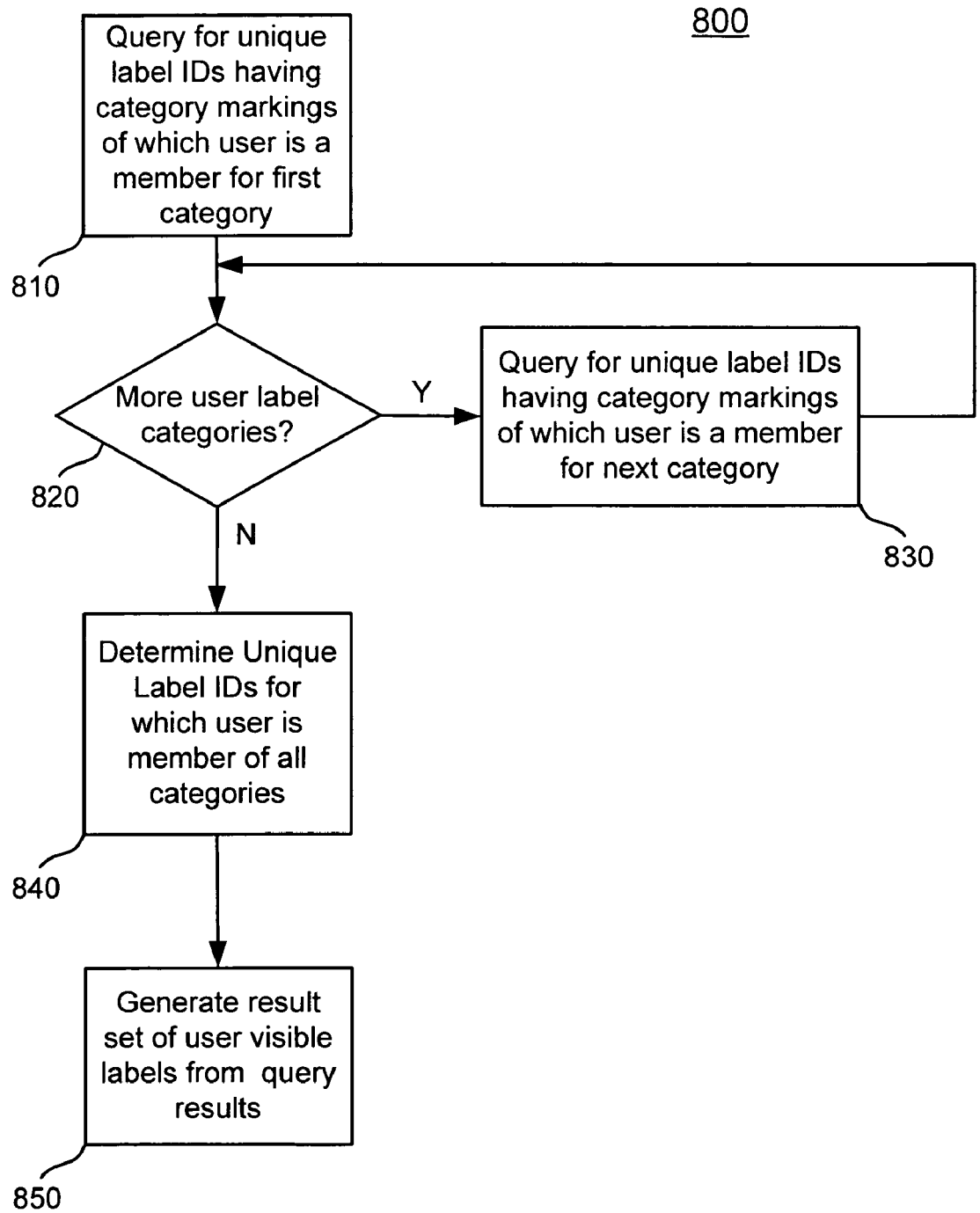
FIG. 8A illustrates an embodiment of a method for generating a user view label.

FIG. 8A illustrates an embodiment of a method 800 for generating user visible labels as discussed at step 730 of method 700. First, a query is made for unique label IDs associated with a user label having category markings of which a user is a member for the first category. As discussed above, a user label may be comprised of several categories. The query made at step 810 is a query made against unique label IDs (or member of the markings role) for which the user is a member of the first category marking. The query can be made against a table such as table 524 of FIG. 5A. For purposes of method 800, assume a user has a user label of S\\Q\\US\\A. Thus, at step 810, a query is made for all unique label IDs wherein the category of classification has a marking of secret or "S". To implement this query, the system may go through the rows of table 524 and select all the unique label IDs corresponding to a category ID of "1" and a mark row name of S. In table 524 of FIG. 5B, this would include unique label ID 200 and 300. Unique label 300 is a match because under the hierarchical system for the classification category, a marking of S dominates the lower marking of C.

After the query is made at step 810, a determination is made as to whether more user label categories exist. If more user label categories exist, then operation continues to step 830. If no more user label categories exist, operation continue step 840. In one embodiment, a query is done for each user category in a user label. At step 830, a query is performed for a unique label ID having category markings of which the user is a member of the next category. Returning to the example user label, a second query is performed for the category of "compartment" at step 830. This query will search table 524 and retrieve every unique label ID corresponding to a category ID of 2 and a marking name of Q (the user's compartment). After the query has been performed in step 830, operation continues to step 820 where additional queries are performed for the remaining categories on the user label. In the case of the example user labels, additional queries are performed for unique label IDs corresponding to a category of three and a marking of US and a category of four and a marking of A.

At step 840, a determination is made as to the unique label IDs for which the user is a member of all the categories. Thus, the label IDs that are common in all the user category queries at step 810 and at step 830 are selected. In one embodiment, an AND operation is performed to the query results of the queries performed at step 810 and 830. In one embodiment, an AND operation is performed between all the predicate clauses discussed above. An example of this is illustrated below.

In one embodiment, wherein the database is a SQL server, predicate language can be used to perform the query against a unique label marking table. A query statement may begin with the statement below.

SELECT ID, Label.ToString( )

FROM tblUniqueLabel WITH (NOLOCK)

WHERE

The where clause definition is based on the category attributes in the desired labeling scheme. The relevant attribute is Comparison Rule. For each category that has a Comparison Rule of ANY (such as categories of "classification", "nationality", and "need to know"), the following predicate can be added to the WHERE clause:

ID IN (SELECT ID FROM tblUniqueLabelMarking WITH (NOLOCK)

WHERE CategoryID =<HardCodedCatID>AND

IS_MEMBER(MarkingRoleName)=1)

The above clause retrieves all the unique label id's containing markings from the given category of which the current user is a member. The sub-query is scanning the tblUniqueLabelMarking table for rows in a certain category. From among these rows, it is choosing the rows which the current user is a member of the database role named in the MarkingRoleName column. This can be accomplished with the SQL Server intrinsic function IS_MEMBER. For each of these rows, the ID of the corresponding record in tblUniqueLabel is returned to the outer query.

For each category that has a Comparison Rule of ALL (for example, the category "compartment"), the following predicate can added to the WHERE clause:

1=ALL(SELECT    IS_MEMBER(MarkingRoleName) FROM tblUniqueLabelMarking (NOLOCK)

WHERE    CategoryID=<HardCodedCatID>AND UniqueLabelID=tblUniqueLabel.ID)

This predicate will result in comparisons which require the user to have all of the applied labels in order to have access. The sub-query gets a list of values returned by IS_MEMBER for every related marking for a given record in tblUniqueLabel. If all of these return values are 1, the predicate is satisfied. Adding the predicates together with an AND operator between them provides a definition for an intermediate view of user label IDs as follows:

CREATE VIEW vwVisibleLabels

AS

SELECT ID, Label.ToString( )

FROM tblUniqueLabel WITH (NOLOCK)

WHERE

ID IN (SELECT ID FROM tblUniqueLabelMarking WITH (NOLOCK)

WHERE CategoryID=1 AND IS_MEMBER(MarkingRoleName)=1)

AND

1=ALL(SELECT    IS_MEMBER(MarkingRoleName) FROM tblUniqueLabelMarking

WHERE    CategoryID=2    AND UniqueLabelID=tblUniqueLabel.ID)

AND ID IN (SELECT ID FROM tblUniqueLabelMarking WITH (NOLOCK)

WHERE CategoryID=3 AND IS_MEMBER(MarkingRoleName)=1)

AND ID IN (SELECT ID FROM tblUniqueLabelMarking WITH (NOLOCK)

WHERE CategoryID=4 AND IS_MEMBER(MarkingRoleName)=1)

GO

FIG. 8B illustrates a table 860 having example labeling scheme design rules. Table 860 is intended as an example of a labeling scheme design for use in a particular application. Other implementations of a labeling scheme desing may be used. Table 860 includes a number of category attributes and corresponding design implications. For each listed category, a rule or action is specified that should be performed by the database management system. The category attributes include "Domain", "Hierarchical", "Cardinality" and "Compare Rule". For the "Domain" attribute, labels are defined in a tblCategory and tlbMarking tables of FIG. 5A. A database role is also created to represent each marking, using role nesting for hierarchical categories. Membership in a particular role indicates that the user has access associated with that role. A hierarchical attribute may have values of "yes" or "no". A "yes" value indicates that roles should be nested to model a hierarchy. A "no" value indicates that no action need be taken to maintain any hierarchy model.

A cardinality attribute may indicate the number of fields in a label. For a cardinality of "1", the number of markings may be constrained on one label using triggers. Alternatively, the category may be de-normalized into a field in the tblUniqueLabel table of FIG. 5A. A cardinality of "1 . . . *" may require no action by a DBMS. A cardinality of "0 . . . 1" or "0 . . . *" may also require no action of a DBMS. However, for each tblUniqueLabel that has zero markings in that category, a row may be created in tblUniqueLabelMarking that assigns the DefaultRole (e.g., public). This enables the category to be non-restrictive for that label.

A Compare Rule attribute may indicate how to compare security labels. A Compare Rule attribute may have values of either "ANY" or "ALL". A value of "ANY" allows a subject label to dominate a data security label if the subject label category satisfies any of the corresponding data security label categories. An example of a where-clause predicate that can be used to implement this design implication is listed below:

ID IN (SELECT ID FROM tblUniqueLabelMarking WITH (NOLOCK)

WHERE CategoryID=n AND IS_MEMBER(MarkingRoleName)=1)

A value of "ALL" allows a subject label to dominate a data security label if the subject label category satisfies all of the corresponding data security label categories. An example of a where-clause predicate that can be used to implement this design implication is listed below:

1=ALL(SELECT    IS_MEMBER(MarkingRoleName) FROM tblUniqueLabelMarking (NOLOCK)

WHERE    CategoryID=n    AND UniqueLabelID=tblUniqueKeyToLabelMappingID)

Once the unique label IDs are determined for which the user is a member of all the categories, a view of the user visible labels is generated from the query results at step 850.

In one embodiment, the view of user visible labels is a list of unique label IDs of which the user label dominates. By performing a number of queries on table 524, a list of unique label IDs dominated by the user label can be determined without having to maintain or generate a database comprising every conceivable unique security label.

In an embodiment wherein an SQL server is used, the user accessible view, which effectively replaces the base table in the eyes of all users, can be generated using statements below:

```
CREATE VIEW UserTable
AS
SELECT <base table column list which does not include RLSMappingID, or any columns from vwVisibleLabel>
FROM tblBaseTable, vwVisibleLabel
WHERE tblBaseTable.RLSMappingID=vwVisibleLabel.ID
GO
GRANT SELECT ON UserTable TO<app_users>
DENY ALL ON tblBaseTable TO<app_users>
GO
```

Rows in a table may be inserted, updated and deleted. A database administrator may configure whether a DBMS allows a user with the required permissions to change table rows or not. In one embodiment, a DBMS that allows a user to update table rows provides for inserting and/or updating the user accessible row, providing valid row labels, generation of new label mapping identification as needed or resolving labels to existing identification, enforcement of write-down and/or write-up logic as required, and performing the insert and/or update action to the underlying base table.

An instead-of trigger may check the validity of labels, generate or retrieve the label mapping identifications, enforce write permission checks and handle the actual insert or update against the base table. The validity of labels may be checked by first converting a row label string to an instance of a user-defined type. The instance of the user-defined type describes the current user's permissions. An example of a portion of code for use with a SQL server for determining an instance of the user-defined type is below:

```
EXECUTE AS CALLER
SELECT @CallerName=CURRENT_USER
REVERT
DECLARE @UserClearance [SecurityLabel]
SET @UserClearance=dbo.GetUserTickets(@CallerName)
```

In one embodiment, a user defined function GetUserTickets may be used to examine role memberships of the current user and generate a label describing the user permission level. The user's permission level can then be compared to any other label. For implementing a write-down only requirement, code for use with an SQL server can be used as follows:

```
IF @UserClearance.HasAccessTo(@RowClassification)=0
    RAISERROR('user rights not sufficient to write this data', 12, 1)
```

The user's permission level is compared to a permission level required to write to a database row. The permission level required to write to the database may be the same or different permission level required to read the database row. Once the user permission level is determined to be sufficient to update the row, the mapping identification for the row label is determined. Determining the mapping identification may include accessing the existing mapping identification or generating a new mapping identification if one is required for a newly added row. Once the mapping identification information is determined, the database row can be updated.

An example of code that may be used to implement an instead-of trigger discussed above is shown below:

```
CREATE TRIGGER dbo.IO_Insert_titles ON titles
INSTEAD OF INSERT
AS
DECLARE @RLSMappingID int
DECLARE @KeyMappingID int
DECLARE @KeyName nvarchar(256)
DECLARE @CertName nvarchar(256)
DECLARE @KeyGUID uniqueidentifier
DECLARE @KeyAlreadyOpen bit
DECLARE @CallerName sysname
BEGIN TRY
    —Bail if @@ROWCOUNT>1 (temporary)
    IF @@ROWCOUNT>1
    RAISERROR('Only one row at a time for the example!', 12, 1)
    —Ensure row_label and advance_label are NOT NULL, not blank, and are valid
    DECLARE @RowLabel nvarchar(256)
    DECLARE @AdvanceCellLabel nvarchar(256)
    SELECT @RowLabel=row_label, @AdvanceCellLabel=advance_label
FROM inserted
    IF @RowLabel IS NULL OR LEN(LTRIM(RTRIM(@RowLabel)))=0
    RAISERROR('row_label is required', 12, 1)
    IF @AdvanceCellLabel IS NULL OR LEN(LTRIM(RTRIM(@AdvanceCellLabel)))=0
    RAISERROR('advance_label is required', 12, 1)
    —Attempting to cast to SecurityLabel will validate the label string
    DECLARE @RowClassification [SecurityLabel]
    SELECT @RowClassification=CONVERT([SecurityLabel], @RowLabel)
    DECLARE @AdvanceClassification [SecurityLabel]
    SELECT @AdvanceClassification=CONVERT([SecurityLabel], @AdvanceCellLabel)
    —Check write-down logic
    EXECUTE AS CALLER
    SELECT @CallerName=CURRENT_USER
    REVERT
    DECLARE @UserClearance [SecurityLabel]
    SET @UserClearance=dbo.GetUserTickets(@CallerName)
    IF @UserClearance IS NULL
    RAISERROR('user rights not sufficient to write this data', 12, 1)
    IF @UserClearance.HasAccessTo(@RowClassification)=0
    RAISERROR('user rights not sufficient to write this data', 12, 1)
    IF @UserClearance.HasAccessTo(@AdvanceClassification)=0
    RAISERROR('user rights not sufficient to write this data', 12, 1)
```

Figure 9A:
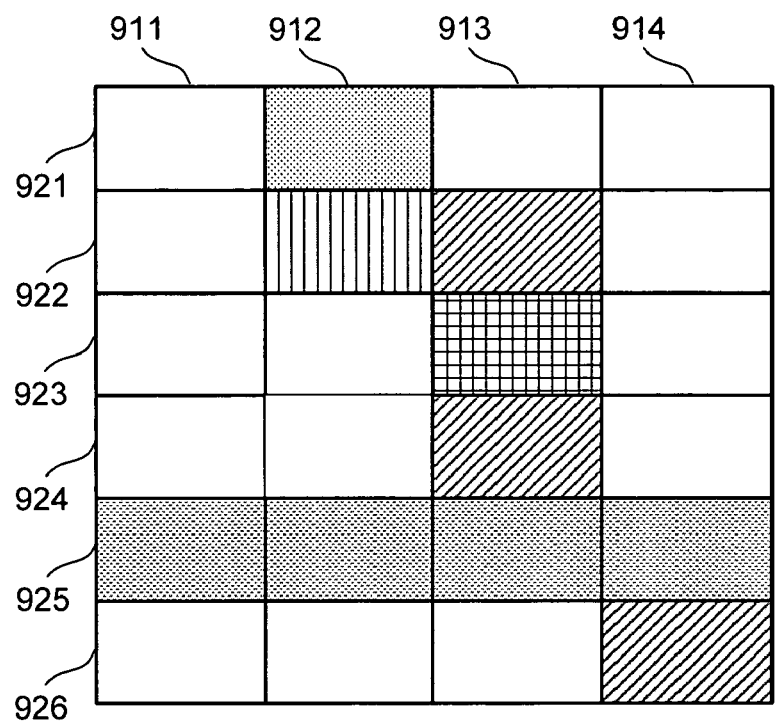
FIG. 9A illustrates an example of a database having cells with different security clearance requirements.

—Get RLSMappingID for row_label
   exec usp_GetRLSMappingID @RowLabel, @RLSMappingID OUTPUT
—Get KeyName and CertName for advance_label
   exec usp_GetKeyForMarking @AdvanceCellLabel, @KeyMappingID OUTPUT, @KeyName OUTPUT, @CertName OUTPUT, @KeyGUID OUTPUT exec usp_IsKeyOpen @KeyName, @KeyAlreadyOpen EXEC('open symmetric key'+@KeyName+'using certificate '+@CertName)—
—Do insert, including rls_mapping_id and encryption of advance
   INSERT INTO tblTitles
   (title_id, title, type, pub_id, price, advance, advance_encrypted, advance_label, royalty,
      ytd_sales, notes, pubdate, row_label, rls_mapping_id)
      SELECT title_id,
      title,
      type,
      pub_id,
      price,
      EncryptByKey(@ KeyGUID, CONVERT(varchar(50), advance)),
      1,
      advance_label,
      royalty,
      ytd_sales,
      notes,
      pubdate,
      row_label,
      @RLSMappingID
      FROM inserted
END TRY BEGIN CATCH
   DECLARE @ErrorMessage NVARCHAR(400);
   DECLARE @ErrorSeverity INT;
   DECLARE @ErrorState INT;
   SELECT @ErrorMessage=ERROR_MESSAGE( );
   SELECT @ErrorSeverity=ERROR_SEVERITY( );
   SELECT @ErrorState=ERROR_STATE( );
   IF @@TRANCOUNT>0
      ROLLBACK
   RAISERROR (@ErrorMessage, @ErrorSeverity, @ErrorState);
END CATCH —Whether successful or not, ensure any key opened by this routine is closed
BEGIN TRY
   IF @KeyName IS NOT NULL AND @KeyAlreadyopen=0
      EXEC('close symmetric key'+@KeyName)
END TRY
BEGIN CATCH
   —suppress error
END CATCH
GO CLS involves providing different levels of clearance to different cells in the database. FIG. 9A illustrates an embodiment of a database 905 having cells with different security clearance requirements. Database 905 includes cells having different shadings. The different shadings indicate different clearances required to view the data in a particular cell. Database 905 includes four columns 911-914 and rows 921-926. The cell located at column 912 and row 921 has a different shading from the cell at column 912 and row 922. This indicates that a different clearance requirement is needed to view the data within those two cells. A user-accessible of a database for implementing CLS is generated in a similar manner as that of the database that implements RLS. Thus, the steps of method 440 of FIG. 4B can be implemented to generate a user-accessible of a database with CLS.

In one embodiment, a CLS database may be associated with meta-data tables that include encryption keys. Cell level encryption is used to implement cell level security clearance.

In one embodiment, the encryption is performed internally by the database server. For example, an SQL server has an internal capability to encrypt individual cells within a database. In one embodiment, EE 112 generates keys as needed for database server 110. Thus, as data is received for encryption within a cell, EE 112 generates a key to encrypt the cell data. The keys are then stored at KCS 114. The keys can be used to encrypt and decrypt data are associated with a key certificate. The key itself can be encrypted and decrypted using the certificate, which is also stored in KCS 114. As discussed above, a unique label table such as unique label table 526 may include columns of unique label IDs, unique security label as well as the name of the key associated with a unique security label as well as the certificate name used to decrypt the key. In this case, a key is used to decrypt the security label and the certificate name is used to retrieve a certificate required to decrypt the key. In one embodiment, similar to RLS databases, a database implementing CLS can be modified to include a column for each database cell label.

Figure 9B:
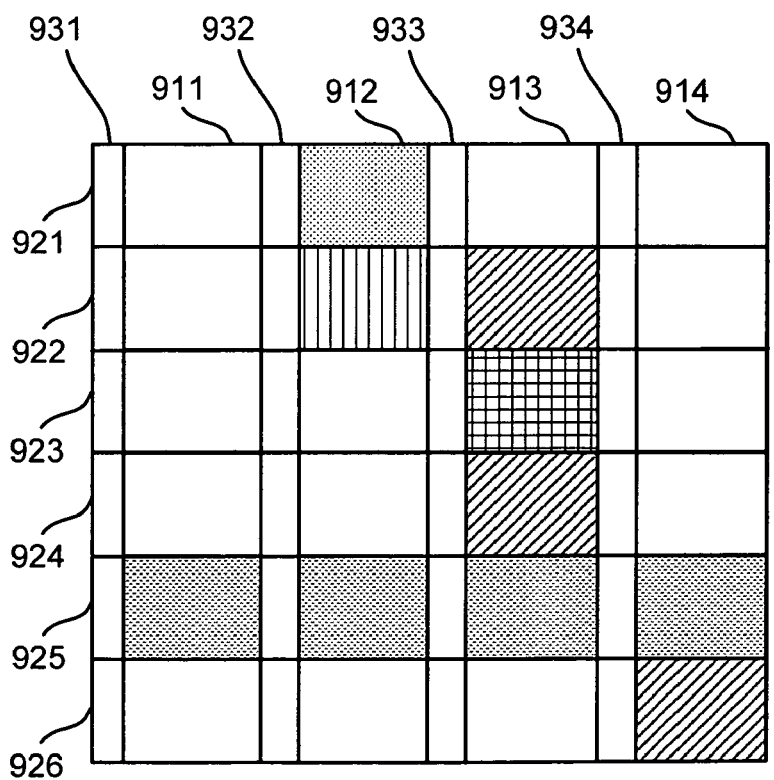
FIG. 9B illustrates an embodiment of a database providing cell level security.

FIG. 9B illustrates a modified base table. In one embodiment, the base table is modified such that security labels for each cell are included in the newly added columns within the table. In the embodiment illustrated in FIG. 9B, columns 931, 932, 933, and 934 have been added to store security labels associated with the cells of columns 911-914.

Figure 10:
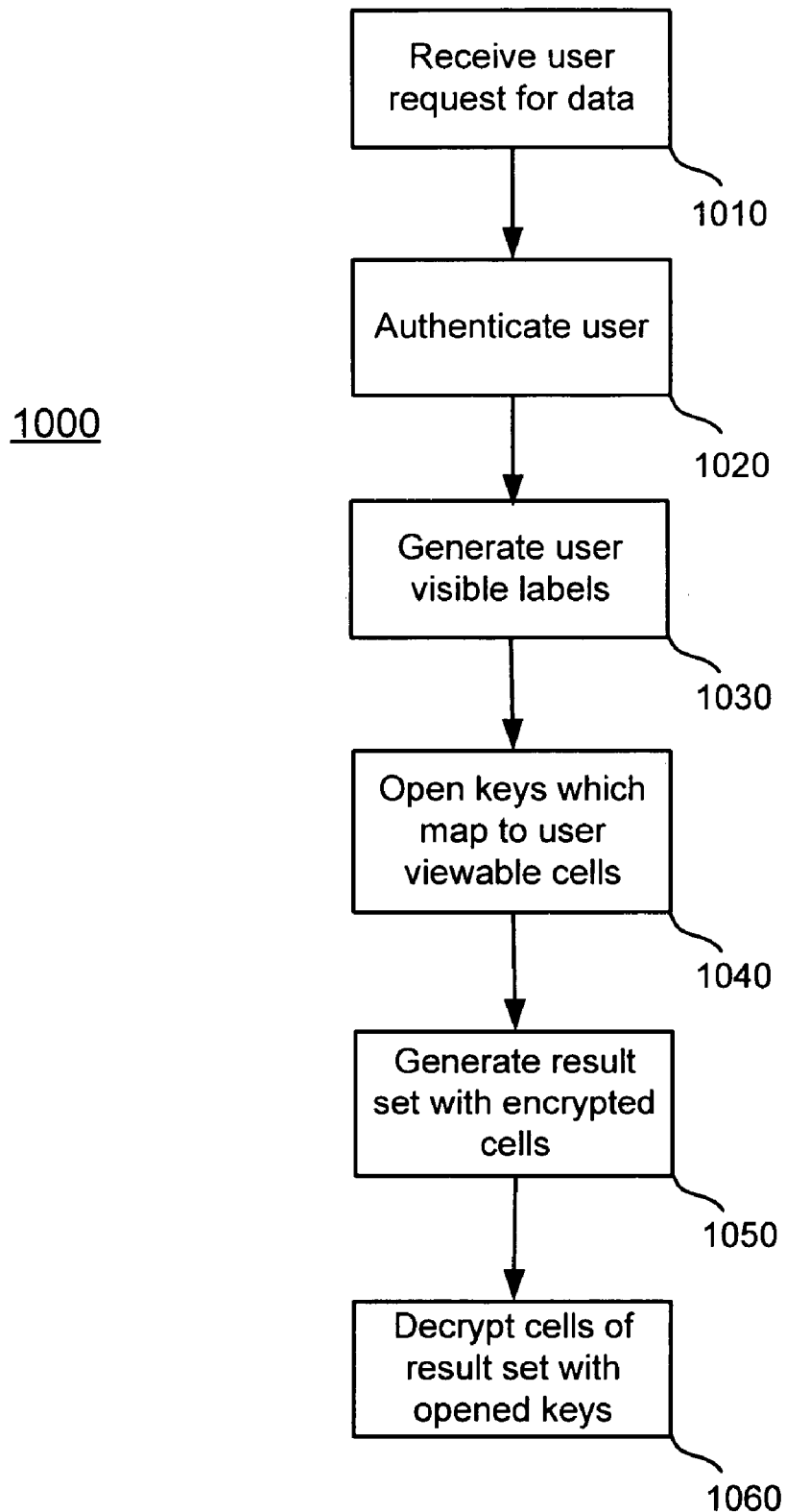
FIG. 10 illustrates an embodiment of a method for generating a user view incorporating cell level security.

An embodiment of a method 1000 for generating a data set derived from incorporating CLS is illustrated in FIG. 10. Database server 110 may provide internal functions to easily encrypt and decrypt data using a certificate, asymmetric key, symmetric key or other types of encryption may also be used in the present invention. Database server 110 manages all three of these key types in KCS 114. In one embodiment, KCS 114 may use an encryption hierarchy that secures certificates and keys at one level with the layer above it in the hierarchy.

In one embodiment, database server 110 can maintain multiple open keys. An open key is a key retrieved from KCS 114 and made available for decrypting data. When a piece of data is to be decrypted, the key required need not be specified. EE 112 is able to match the encrypted byte stream to an open key if the correct key has been decrypted (using a certificate) and is open. The key will then be used to perform decryption and return the data. If the correct key is not open, a null value is returned. In this case, no indication that data exists in the cell will be presented to a user. In one embodiment, CLS may be implemented by creating a symmetric key for each unique label used to mark data in the database, encrypting data in labeled cells with the corresponding key, and controlling access to keys such that the keys which map to labels dominated by the user's label are opened. This provides a simple-way to have these keys opened when the connection is established by the requesting user.

Returning to method 1000, a user request for data is received at step 1010. Next, a user is authenticated at step 1020. User authentication at step 1020 is similar to user authentication performed at step 720 of method 700. Next, user visible labels are generated at step 1030. Generation of user visible labels for CLS is similar to generation of user visible labels performed in step 730 of method 700 and method 800 as discussed above. Next, keys which map to the user visible cells are opened at step 1040. In one embodiment, keys associated with a user label are opened automatically at the time of the user connection with database server 110. This is discussed below with respect to method 1100 of FIG. 11. A result set having encrypted cells is then generated at step 1050. Next, encrypted cells of the result set are decrypted with the opened keys at step 1060. In one embodiment, the DBMS may automatically determine which opened key is associated with a particular encrypted cell.

In one embodiment, when database server 110 is implemented by an SQL server, a view may be generated be the code statements below.

CREATE VIEW UserTable

AS

SELECT ID,
   DecryptByKey(SensitiveData),
   CONVERT(money, CONVERT(varchar(50), DecryptByKey(SensitiveMoneyData))),
   NonSensitiveData, FROM tblBaseTable, vwVisibleLabel WHERE tblBaseTable.RLSMappingID=vwVisibleLabel.ID

GO

GRANT SELECT ON UserTable TO <app_users>

DENY ALL ON tblBaseTable TO <app_users>

GO

Figure 11:
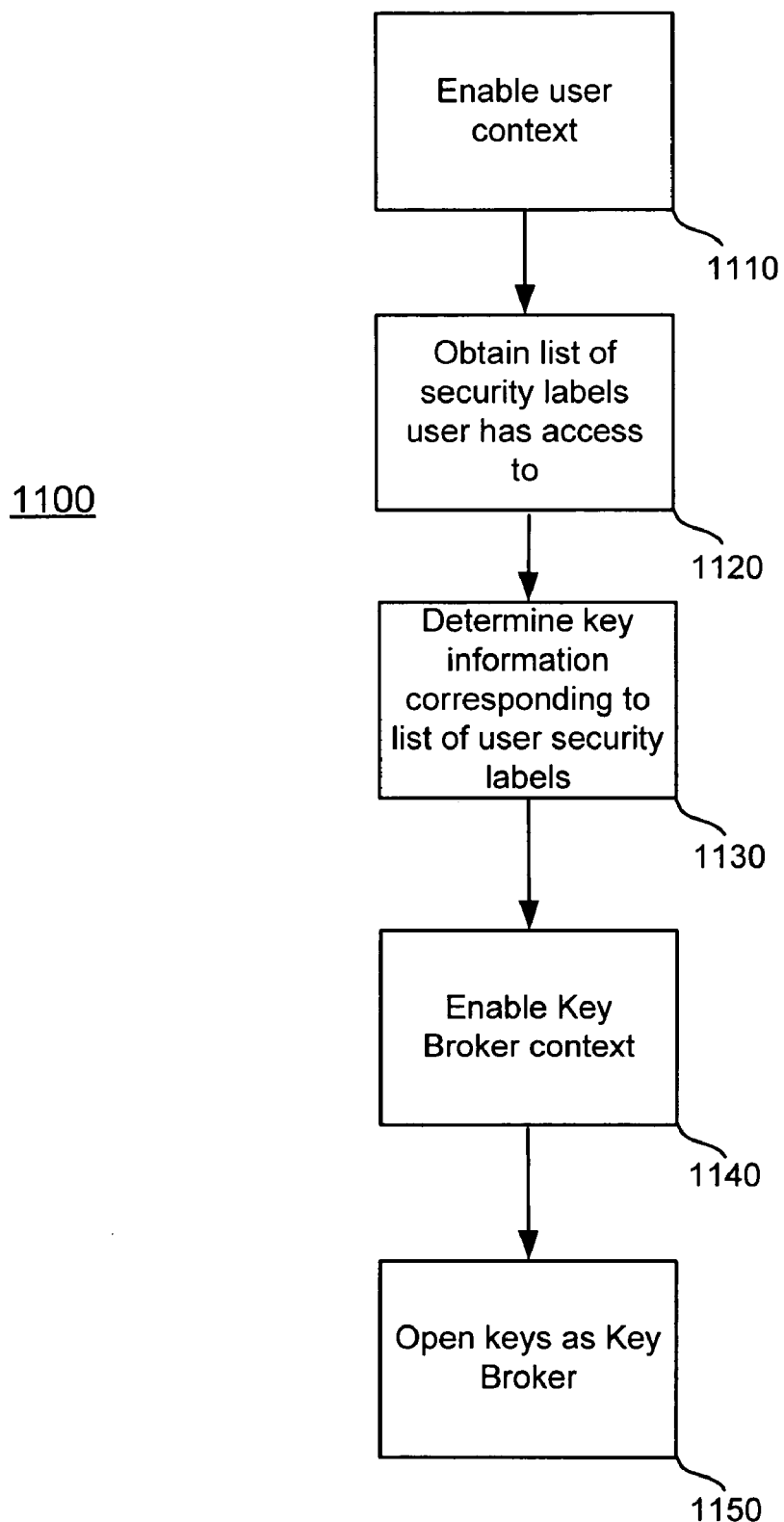
FIG. 11 illustrates an embodiment of a method for opening keys associated with a database.

FIG. 11 illustrates an embodiment of a method 1100 for opening keys associated with encrypted fields of a database incorporating CLS. In one embodiment, method 1100 implements step 1040 of method 1000. First, a user context is enabled at step 1110. In one embodiment, a user context is enabled to make requests for user information to a database system at step 1110. Lists of security labels that the user has access to are obtained at step 1120. In one embodiment, the list is generated at step 1030 of method 1000. Next, decryption information such as key names and certificate names corresponding to the list of user security labels is determined at step 1130. The key name and certificate name is included in the database utilizing CLS unique label tables, such as table 524. In one embodiment, a list of keys is obtained corresponding to the cells associated with database labels dominated by the user label. Next, a key broker context is enabled at step 1140. Keys are then opened by the key broker at step 1150. In one embodiment, the key broker opens keys using the key certificates. In one embodiment, a user is not allowed access to any keys. Key access is only allowed to the key broker. In this case, opening keys is performed by the key broker which retrieves the key ID from a combination of roles, not individual users.

In one embodiment, when database server 110 is implemented by an SQL server, opening keys can be performed by the code statements below.

CREATE PROCEDURE usp_EnableCellVisibility

WITH EXECUTE AS 'KeyBroker'

AS

DECLARE @KeyName nvarchar(256)

DECLARE @CertName nvarchar(256)

DECLARE Key_Cursor CURSOR LOCAL FORWARD_ONLY STATIC FOR

SELECT KeyName, CertName

FROM vwVisibleLabels

EXECUTE AS CALLER

—Since the cursor is STATIC, it is fully

—populated here based on the caller's identity

OPEN Key_Cursor

REVERT

FETCH NEXT FROM Key_Cursor INTO @KeyName, @CertName

WHILE @@FETCH_STATUS=0

BEGIN
   open symmetric key @KeyName using certificate @CertName
   FETCH NEXT FROM Key_Cursor INTO @KeyName, @CertName

END

CLOSE Key_Cursor

DEALLOCATE Key_Cursor

GO

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer implemented method for providing access to a database, comprising:
   receiving a request for data for a user;
   receiving a set of user access tokens associated with the user the set of user access tokens comprising a first label, object labels are assigned to rows or cells in the database, the database has one or more metadata tables that associate the user access tokens with the object labels;
   determining, based on the one or more metadata tables, which of the object labels are associated with each of the user access tokens to form a set of zero or more object labels for each of the user tokens in the first label;
   forming a subset of object labels that includes object labels that are common to the sets of object labels for the user tokens, the subset of object labels defines rows or cells in the database to which the user is allowed access, the subset of object labels is formed dynamically after receiving the user request for data;
   selecting data within the database associated with the subset of object labels, the selecting includes determining which row or cell in the database has associated therewith at least one of the object labels in the subset of object labels; and providing access to the data that is associated with the selected set of object labels.

2. The method of claim 1, wherein said step of forming a subset of object labels includes:
performing an AND operation to the set of zero or more object labels for each of the user tokens in the first label.

3. The method of claim 1, wherein the set of user tokens is a set of security permission categories.

4. The method of claim 3, wherein each category has one or more markings.

5. The method of claim 3, wherein each category is associated with a set of attributes.

6. The method of claim 5, wherein each attribute is associated with an action.

7. The method of claim 4, wherein each database field is associated with a set of markings.

8. The method of claim 1, wherein providing access to the data includes:
decrypting the data associated with the subset of object labels.

9. The method of claim 1, wherein the object labels are associated with cells in the database and the selecting data within the database includes determining which of the cells have associated therewith at least one of the object labels in the subset of object labels.

10. A computer implemented method for managing database field encryption, comprising:
accessing data to be stored in different fields of a database;
assigning a unique object label to each of the fields in which the data is to be stored;
generating a plurality of encryption keys for the accessed data, each of the fields in which the accessed data is to be stored has associated therewith one of the encryption keys;
encrypting the data with the encryption keys;
storing the encrypted data in the fields of the database;
determining a user label for a user requesting access to data in the database;
determining at least one field that the user is allowed to access based on the user label;
determining a set of one or more encryption keys associated with the at least one field that the user is allowed to access;
generating a result set of encrypted data, the result set including encrypted data for a first row of of data in the database, the first row having the at least one field that the user is allowed to access and at least one field that the user is not allowed to access;
decrypting data in the at least one field that the user is allowed to access using the set of one or more encryption keys without decrypting data in the at least one field that the user is not allowed to access to generate a final result set; and
providing access outside of the database to the final result set.

11. The method of claim 10, wherein accessing the data includes:
receiving the data at a database management system (DBMS) that controls the database, the object label that is assigned by the DBMS to each field is derived from information embedded in the received data.

12. The method of claim 10, wherein accessing the data includes:
receiving the data at a database management system (DBMS) that controls the database, the object label that is assigned by the DBMS to each field is derived from a data source associated with the received data.

13. The method of claim 10, further comprising:
encrypting each of the encryption keys with a unique data certificate;
associating each of the data certificates with one of the object labels;
selecting one or more digital certificates associated with a first object label of the object labels, the first object label is dominated by the user label; and
decrypting an encryption key with each selected digital certificate.

14. A computer implemented method for managing meta-data, comprising:
receiving one or more sets of data tokens, each set of tokens associated with a label;
determining a category identifier for each token in each set of data tokens;
generating a data label identifier for each set of data tokens; and
associating each token in the set of data tokens with the associated category identifier and data label identifier;
maintaining the tokens, the associated category identifiers and the generated data label identifiers in a meta-data table;
associating the data label identifiers with different portions of data in a base table based on security clearance for each of the portions of data; and
generating a user accessible view based at least in part on the base table and the meta-data table, the user accessible view is for providing access control to the base table, the base table is controlled by a database management system (DBMS) and the user accessible view is generated by statements generated in the DBMS.

15. The method of claim 14, wherein each data label includes tokens in the same category.

16. The method of claim 14, wherein each label is a unique label.

17. The method of claim 16, wherein associating each token includes:
maintaining each set of tokens and associated unique label in a table.

18. The method of claim 14, wherein determining a category for each token includes:
determining a valid digital signature associated with the sets of data tokens.

19. The method of claim 14, wherein the associating the data label identifiers with different portions of data in a base table includes associated a first of the data label identifiers with either a row or a cell in the base table.

20. The method of claim 10, wherein the database is controlled by a database management system (DBMS) and the encrypting the data with the encryption keys and the decrypting data in the at least one field that the user is allowed to access using the set of one or more encryption keys is performed within the DBMS.

* * * * *